(No Model.)

W. WILCOX & W. A. WILCOX, Jr.
AUTOMATIC SUPPLY VALVE FOR EVAPORATORS.

No. 405,449. Patented June 18, 1889.

Witnesses,

Inventor
Wm. Wilcox
Wm. A. Wilcox Jr
By their Attorneys
Johnston, Reinohl & Dyne

UNITED STATES PATENT OFFICE.

WILLIAM WILCOX AND WILLIAM A. WILCOX, JR., OF GRAND RAPIDS, MICHIGAN.

AUTOMATIC SUPPLY-VALVE FOR EVAPORATORS.

SPECIFICATION forming part of Letters Patent No. 405,449, dated June 18, 1889.

Application filed September 8, 1887. Serial No. 249,137. (No model.)

*To all whom it may concern:*

Be it known that we, WILLIAM WILCOX and WILLIAM A. WILCOX, Jr., citizens of the United States, residing at Grand Rapids, in the county of Kent and State of Michigan, have invented new and useful Improvements in Automatic Supply-Valves for Evaporators, of which the following is a specification.

Our invention relates to improvements in automatic supply-valves for evaporators, which will be hereinafter described, and particularly pointed out in the claim.

Figure 1:
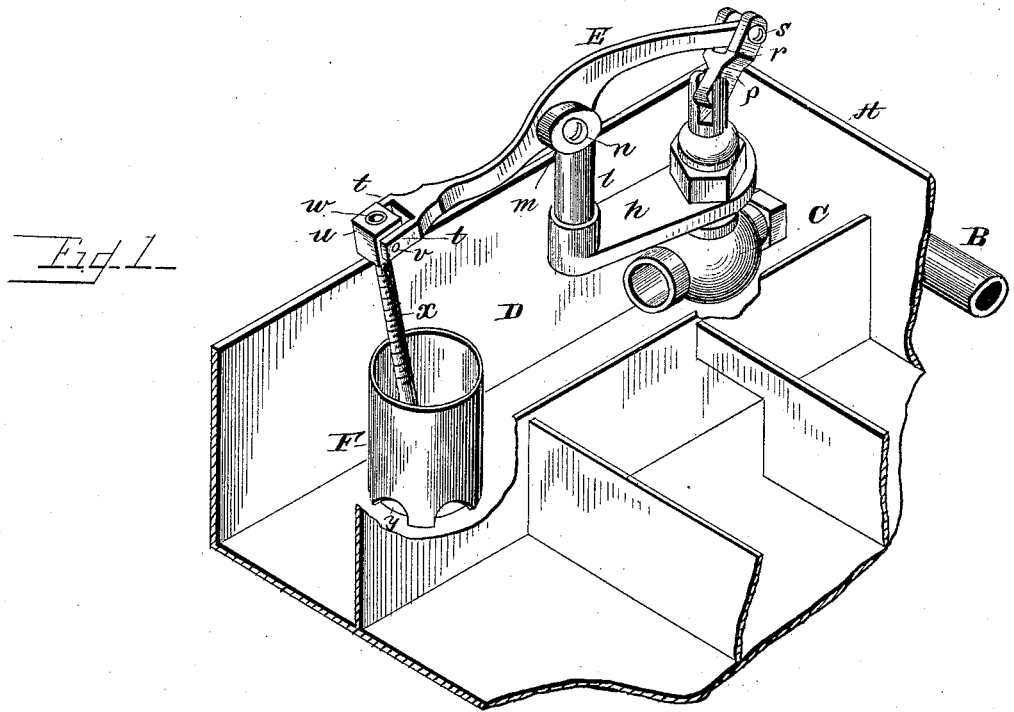
Figure 2:
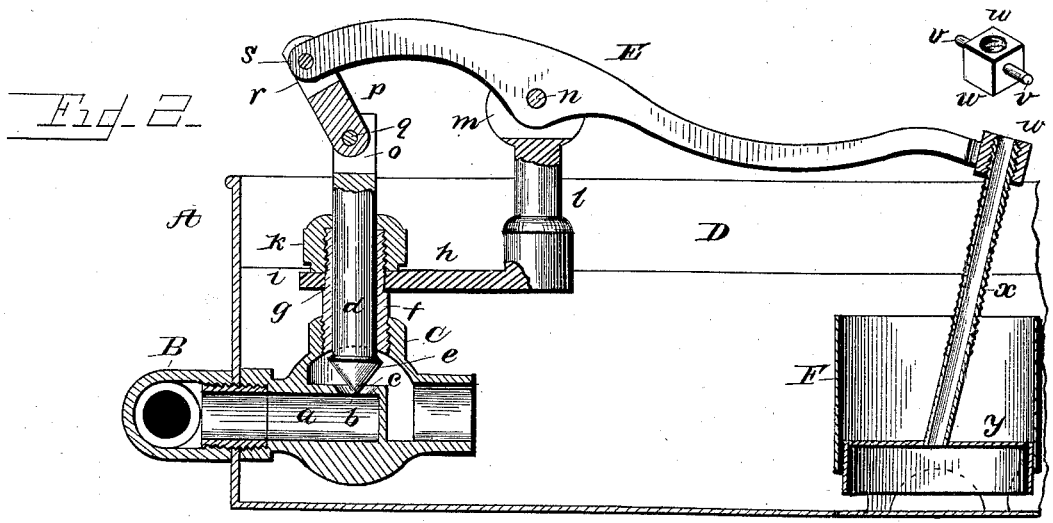

In the accompanying drawings, Figure 1 represents a perspective view of part of an evaporating-pan with our improved valve attached, and Fig. 2 is a longitudinal section thereof.

Reference being had to the drawings and the letters thereon, A indicates an evaporating-pan; B, the supply-pipe which communicates with a heater (not shown) at one end, and at the opposite end it is provided with a regulating-valve C, which discharges the juice from the heater into the receiving-compartment D of the evaporating-pan.

The valve C is provided with a diaphragm $a$, through which is formed an opening $b$, having a conical seat $c$, for the plug $d$, which is provided with a conical head $e$, which corresponds with the seat $c$. To the upper side of the valve-case a sleeve $f$ is attached, and upon said sleeve is formed a shoulder $g$, which forms a seat for the inner end of a plate $h$, which has an aperture in it, which fits the cylindrical portion $i$ of the sleeve and is secured in position on the sleeve $f$ by a nut $k$. On the outer end of the plate $h$ is a post $l$, having a slot $m$ in its upper end to receive a lever E, which is fulcrumed therein by a transverse pin $n$, passing through the flanges of the post and through the lever.

The plug $d$ extends through the sleeve $f$ and the nut $k$, and is slotted at its outer end, as at $o$, to receive a link $p$, which is pivotally connected thereto by a pin $q$, and the upper end of the link has a slotted head $r$, formed on it, in which one end of the lever E is pivotally secured by the pin $s$. The opposite end of the lever E is bifurcated, and between the arms $t\ t$ a nut $u$, having a trunnion $v$ on each side, is supported to oscillate freely therein. The nut has a screw-threaded aperture $w$ in it, with which the hollow screw-threaded stem $x$ of the float $y$ engages, and is adjusted therein to suit any quantity of juice it is desired to treat in the pan.

The float $y$, which is of less specific gravity than the juice, works in a cylinder F, and the juice for operating the float is admitted to the under side of the float through apertures $z$ in the wall of the cylinder. The hollow stem of the float affords egress to any steam which may accumulate in the float and prevents the possibility of its exploding.

By the construction shown the float may be set to operate the valve C to maintain any depth of juice desired in the evaporator, and the supply is regulated automatically, and the pivoted nut $u$ at one end of the lever E and the link or toggle $p$ at the opposite end accommodate themselves to the movement of the float $y$ without binding the valve in any position the float may assume.

Having thus fully described our invention, what we claim is—

In an evaporator, the combination of a supply-pipe, a valve having a stem projecting through the upper end of the valve-case, a sleeve surrounding the stem, provided with a shoulder or seat, a detachable plate supported upon said sleeve and seat and provided with a post at its free end having a fulcrum on its upper end, a nut for clamping said plate upon said sleeve, a float having an externally screw-threaded rod, a lever having a link connecting it to the valve-stem, and a nut pivoted in the opposite end, by which it is connected to the float, substantially as described.

In testimony that we claim the foregoing as our own we have hereto affixed our signatures in presence of two witnesses.

WILLIAM WILCOX.
WILLIAM A. WILCOX, JR.

Witnesses:
CORNELIUS L. HARVEY,
FRANK P. CARPENTER.